United States Patent
Scharber et al.

(10) Patent No.: US 10,554,607 B2
(45) Date of Patent: Feb. 4, 2020

(54) HETEROGENEOUS CLOUD CONTROLLER

(71) Applicant: Telefonaktiebolaget LM Ericsson (publ), Stockholm (SE)

(72) Inventors: John M. Scharber, Placerville, CA (US); Mark A Green, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 15/441,756

(22) Filed: Feb. 24, 2017

(65) Prior Publication Data
US 2018/0248827 A1 Aug. 30, 2018

(51) Int. Cl.
  *G06F 15/16* (2006.01)
  *H04L 12/58* (2006.01)
  *H04L 29/08* (2006.01)

(52) U.S. Cl.
  CPC .............. *H04L 51/18* (2013.01); *H04L 67/10* (2013.01); *H04L 67/141* (2013.01)

(58) Field of Classification Search
  CPC ....... H04L 51/18; H04L 67/141; H04L 67/10; H04L 12/58; H04L 29/08; G06F 9/541
  See application file for complete search history.

(56) References Cited

U.S. PATENT DOCUMENTS

| | | | |
|---|---|---|---|
| 6,338,081 B1 * | 1/2002 | Furusawa | H04L 41/0226 709/202 |
| 6,961,778 B2 * | 11/2005 | Swartz | H04L 29/06 709/223 |
| 9,213,582 B2 | 12/2015 | Narendra et al. | |
| 2007/0280206 A1 * | 12/2007 | Messer | H04L 12/66 370/352 |
| 2010/0042449 A1 * | 2/2010 | Thomas | G06Q 10/06 705/35 |
| 2010/0169888 A1 * | 7/2010 | Hare | G06Q 10/107 718/102 |
| 2012/0158821 A1 | 6/2012 | Barros | |
| 2012/0317591 A1 * | 12/2012 | Samson | G06F 9/541 719/330 |

(Continued)

OTHER PUBLICATIONS

Oracle Communications, Oracle White Paper, "Making Money Through API Exposure; Enabling New Business Models", Sep. 2014, 18 pages.

(Continued)

*Primary Examiner* — Cheikh T Ndiaye
(74) *Attorney, Agent, or Firm* — Rothwell, Figg, Ernst & Manbeck, p.c.

(57) ABSTRACT

Heterogeneous cloud controllers are employed to communicatively couple a plurality of service providers to a publisher-subscriber queue. The heterogeneous cloud controllers may provide a unified communication framework for clients to communicate with the service providers, as well as for the service providers to communicate with one another. A global language may be established by the heterogeneous cloud controller, and a mapping may be created between the global language and the local language of each of the service providers. Each of the heterogeneous cloud controllers may form a bridge between the global language employed at the publisher-subscriber queue and the local language employed at a corresponding service provider.

17 Claims, 15 Drawing Sheets

(56) References Cited

U.S. PATENT DOCUMENTS

2013/0268676 A1  10/2013  Martins et al.
2016/0063077 A1*  3/2016  Pyke .................. G06F 17/30557
                                                                     707/756
2017/0085512 A1*  3/2017  Bray ....................... H04L 51/22

OTHER PUBLICATIONS

Ericsson, Ericsson White Paper, "Operator Service Exposure; Enabling Differentiation and Innovation", Nov. 2015, 10 pages.
Rayburn, Dan, "Limelight Looking to Improve Content Delivery Efficiency With a Smarter Purge Solution", Apr. 6, 2015, 11 pages.
Blum, Niklas, Magedanz, Thomas, Schreiner, Florian, "Definition of a Service Delivery Platform for Service Exposure and Service Orchestration in Next Generation Networks, " Ubiquitous Computing and Communication Journal, vol. 3 No. 3, Jul. 2008.
"Network functions virtualization", Hewlett Packard Enterprise, Technical White Paper (Feb. 2017, Rev. 6), 11 pages.

* cited by examiner

```
curl https://api.udn.net/brands/udn/accounts/1/groups/1/services/mediadelivery/

{
"services": [
    {
    "key": "123e4567-e89b-12d3-a456-426655440000",
    "description": "Media Delivery for Streaming & Software download",
    "type": "mediadelivery",
    "handlers": [
        {
        "interface": "purge",
        "schema_endpoint": "api.udn.net/account/1/services/purge/schema",
        "capabilities_endpoint": "api.udn.net/purge/capabilities",
        "protocol": "https",
        "authentication": "token", "interface": "logging",
        ....

"interface": "account creation",
        ....

"interface": "business service creation",
        ....

"interface": "request routing",
        ....

"start_date": "x.x.x",
        "end_date": "x.x.x",
        "
         ......
}
```

Fig. 3A

```
curl https://api.udn.net/brands/udn/account1/groups/1/services/mediadelivery/purge/schema
{
    "$schema": "http://json-schema.org/draft-04/schema#",
    "type": "object",
    "properties": {
        "action": {
            "type": "string"
        },
        "objects": {
            "type": "array",
            "items": {
                "type": "string"
            }
        },
        "note": {
            "type": "string"
        },
        "feedback": {
            "type": "object",
            "properties": {
                "email": {
                    "type": "string"
                }
            },
            "required": [
                "email"
            ]
        }
    },
    "required": [
        "action",
        "objects",
        "note",
        "feedback"
    ]
}
```

Fig. 3B

```
curl https://api.udn.net/brands/udn/account1/groups/1/services/mediadelivery/purge/capabilities
{
"purge_actions": ["purge", "invalidate"],
"objects": ["directory", "file", "extension", "glob", "regex", "domains", "account", "group"],
"status": ["job", "queue_size", "estimated_queue_time"]
}
```

Fig. 3C

```
{
  "register": {
    "account_id": "xxxxx",
    "X-Auth-Token": "1baa1bd78faf460eb9fd0c27fa576f90",
    "services": [
      {
        "1baa1bd78faf460eb9fd0c27fa576f90": {
          "name": "mediadelivery",
          "handlers": [
            {
              "interface": "purge",
              "endpoint": "api.sp.net/udn/purge",
              "protocol": "https",
              "authentication": "token",
              "capabilities": [
                {
                  "purge_actions": ["purge"],
                  "objects": ["directory", "file", "account"],
                  "status": ["job", "queue_size", "estimated_queue_time"]
                }
              ]
            },
            "interface": "logging",
            ...
            "interface": "account creation"
            ...
            "interface": "business service creation"
            ...
            "interface": "request routing"
            ...
          },
          ...
        }
      }
    ]
  }
}
```

Fig. 3D

| Global Interface Handler | Local Interface Handler |
|---|---|
| Purge | Purge |
| Logging | Logging |
| Account Creation | Account Creation |
| Business Services Creation | Business Services Creation |
| Request Routing | Request Routing |

Fig. 4A

| Global Interface Handler | Global Capabilities | | | Local Capabilities | Alternative Capability |
|---|---|---|---|---|---|
| Purge | Actions | Purge | | Purge | |
| | | Invalidate | | N/A | URL Signing |
| | Objects | Directory | | Directory | |
| | | File | | File | |
| | | Extension | | N/A | no |
| | | Glob | | N/A | no |
| | | Regex | | N/A | no |
| | | Domains | | N/A | no |
| | | Account | | Account | |
| | | Group | | N/A | no |
| | Status | Job | | Job | |
| | | Queue Size | | Queue Size | |
| | | Estimated Queue Time | | Estimated Queue Time | |
| | ... | | | ... | ... |
| Logging | | | | | |
| ... | | | | | |

Fig. 4B

HETEROGENEOUS CLOUD CONTROLLER

FIELD OF THE INVENTION

The present invention relates to interfacing a plurality of heterogeneous service providers to a publisher-subscriber queue via one or more heterogeneous cloud controllers.

BACKGROUND

Increasingly, services are being provided from "the cloud" (i.e., being provided from a location remote from the user). The provider of the services may be called a "service provider", and the user of the services may be called a client. The service provider in some cases may own the cloud resources (e.g., compute resources, network resources, storage resources, etc.), while in other cases, may pay another entity for the use of such resources. The advantages offered to a client is the ability to use the services without needing to manage the software (e.g., perform software updates) or the hardware (e.g., purchase more storage, etc.).

The rapid deployment of cloud services has resulted in communication interfaces offered by service providers that are disjoint from one another. A first set of function calls and schema must be used to communicate with a first service provider and a second set of function calls and schema must be used to communicate with a second service provider. One way to address such disjoint communication is to mandate that all service providers "speak in a common language" (e.g., use common variable names, function names, etc.). Such approach, however, requires much redesign of existing systems. Techniques are described hereinbelow which allow service providers to maintain their autonomy, while at the same time provides a unified framework for clients to communicate with service providers, as well as for service providers to communicate with one another.

SUMMARY OF THE INVENTION

In accordance with one embodiment of the invention, a plurality of heterogeneous cloud controllers are employed to communicatively couple one or more service providers to a publisher-subscriber queue. Communication which takes place at the publisher-subscriber queue may conform to a "global language" (i.e., common set of function calls, variable names, data types, etc.). The "global language" may also be called an "internal API". Therefore, each heterogeneous cloud controller may serve as a bridge between the "local/native language" at each of the service providers and the global language at the publisher-subscriber queue. As a result, any entity which communicates with the publisher-subscriber queue only needs to be capable of communicating via the internal API, and need not be equipped to communicate with the service provider specific APIs.

Certain initialization tasks may be performed to set up this unified communication framework. First, a global language may be defined. In one embodiment, defining a global language includes defining a set of global interface handlers (e.g., purge, logging, account creation, business services creation, and request routing) for a specific service (e.g., media delivery). Defining a global language may also include defining global capabilities for each of the global interface handlers (e.g., purge and invalidate actions for the purge interface handler). Defining a global language may also include defining a global schema (e.g., defining global variable names and global data formats).

After defining the global language, a registration process may be performed to discover the local language of each of the service providers. As part of the registration process, a set of local interface handlers may be received from each of the service providers for a particular service. For example, the set of local interface handlers for the service of media delivery may be purge, logging, account creation, business services creation and request routing. Further, as part of the registration process, local capabilities of each of the interface handlers may be received from each of the service providers. Further, as part of the registration process, local schema may be received from each of the service providers for a given service (e.g., local variable names, local data formats, etc.).

After performing the registration process, a mapping process may be performed during which a correspondence may be established between the global language and local language. More specifically, a correspondence may be established between global interface handlers and local interface handlers, global capabilities and local capabilities, global schema and local schema, etc. Such correspondences may be stored in a mapping, for use during subsequent translation processes. In some instances, the mapping may map one variable name in the global language to another variable name in the local language (e.g., for two variables that represent the same information). In other instances, the mapping may map the location of a variable in the global language (e.g., whether the variable is in the path, query, header, body of an HTTP request message) to another location of the variable in the local language.

In some instances, the mappings may be incomplete, and an alternative capability (e.g., an alternative action) may performed by the heterogeneous cloud controller in place of a global capability (e.g., a global action) that is not supported by a service provider. For example, the invalidate action may not be supported by a service provider, and URL signing may be performed by a heterogeneous cloud controller in place of the invalidate action.

After the initialization process has concluded, the unified communication framework may be employed. In a particular use case, a heterogeneous cloud controller may retrieve a message from the publisher-subscribe queue. The heterogeneous cloud controller may translate the message from the global language into the local language of a service provider (utilizing the mappings briefly described above). After a translated message is provided to a service provider, the service provider may process the message in accordance with its typical operations. If a reply message is generated by the service provider, the reply message may be provided to the heterogeneous cloud controller in either a pull or a push manner. In the pull manner, the heterogeneous cloud controller may periodically poll a service provider for any reply messages. In the push manner, the service provider may push a reply message to a heterogeneous cloud controller whenever a reply message is generated. Following a translation of the reply message (if any), the heterogeneous cloud controller may publish the reply message on the publisher-subscriber queue.

These and other embodiments of the invention are more fully described in association with the drawings below.

BRIEF DESCRIPTION OF THE DRAWINGS

FIG. 3A provides a definition of a global interface handler, in accordance with one embodiment of the invention.

FIG. 3B provides a definition of the schema for a global interface handler, in accordance with one embodiment of the invention.

FIG. 3C provides a definition of the capabilities of a global interface handler, in accordance with one embodiment of the invention.

FIG. 3D provides registration information of a local interface handler of a service provider, in accordance with one embodiment of the invention.

FIG. 4A depicts a mapping from a set of global interface handlers to a set of local interface handlers, in accordance with one embodiment of the invention.

FIG. 4B depicts a mapping from a list of global capabilities to a list of local capabilities, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
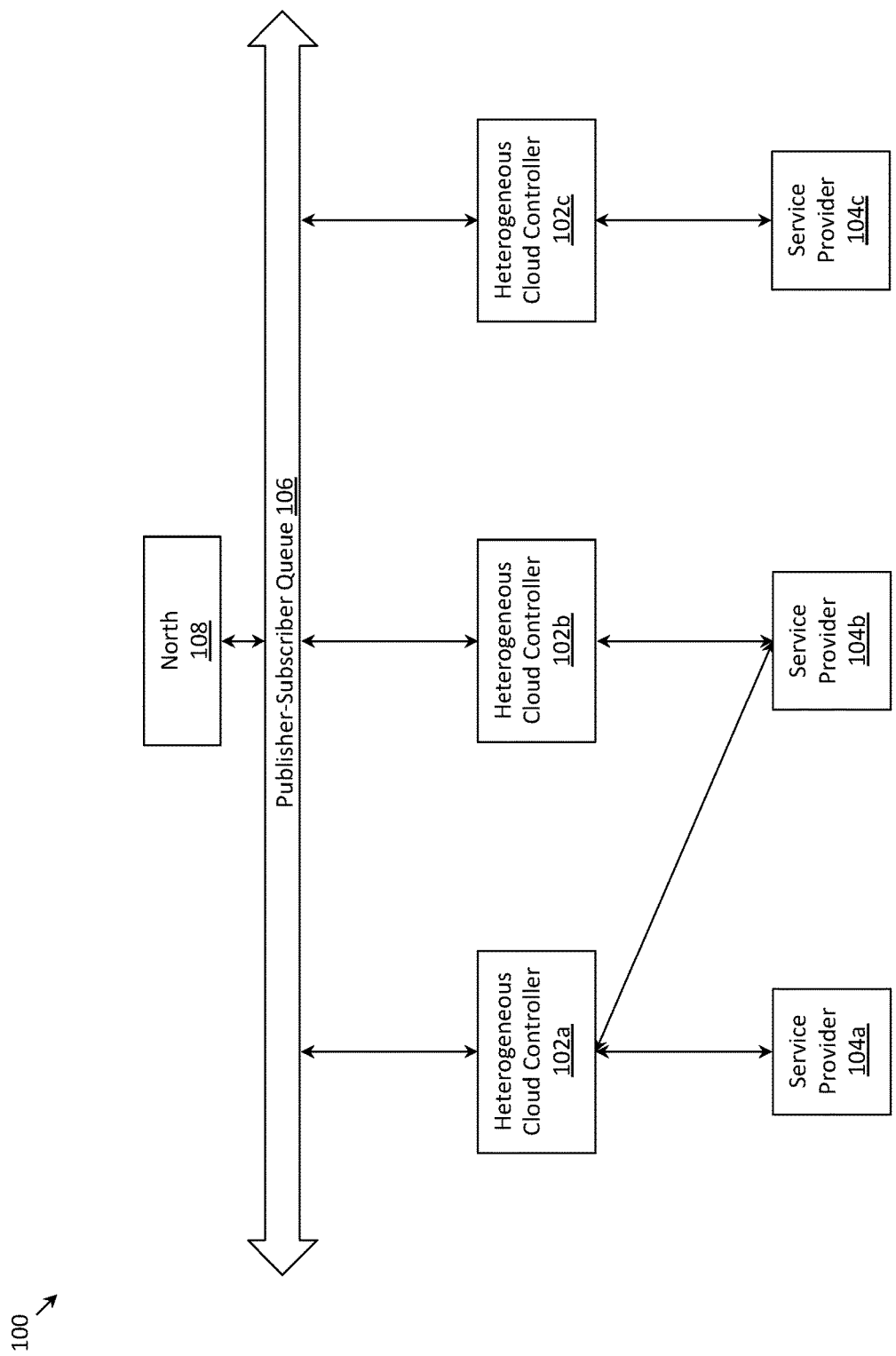
FIG. 1 depicts a computing system in which a plurality of service providers are communicatively coupled to a publisher-subscriber queue via respective heterogeneous cloud controllers, in accordance with one embodiment of the invention.

FIG. 1 depicts computing system 100 with a plurality of heterogeneous cloud controllers (102a, 102b, 102c) which communicatively couple one or more of service providers (104a, 104b 104c) to publisher-subscriber queue 106. In the example of FIG. 1, heterogeneous cloud controller 102a communicatively couples service providers 104a and 104b to publisher-subscriber queue 106; heterogeneous cloud controller 102b communicatively couples service provider 104b to publisher-subscribe queue 106; and heterogeneous cloud controller 102c communicatively couples service provider 104c to publisher-subscriber queue 106.

In one embodiment of the invention, each of the heterogeneous cloud controllers may provide a certain type of service. For example, heterogeneous cloud controller 102a may provide IoT support services, heterogeneous cloud controller 102b may provide media delivery, and heterogeneous cloud controller 102c may provide payroll services. In the context of the publisher-subscriber queue, this would mean that heterogeneous cloud controller 102a would subscribe to messages which relate to IoT support; heterogeneous cloud controller 102b would subscribe to messages which relate to media delivery; etc. Service providers 104a and 104b being communicatively coupled to heterogeneous cloud controller 102a indicates that these service providers provide IoT support services; service provider 104b being communicatively coupled to heterogeneous cloud controller 102b indicates that service provider 104b provides media delivery; service provider 104c being communicatively coupled to heterogeneous cloud controller 102c indicates that service provider 104c provides payroll services.

North module 108 may also be communicatively coupled to publisher-subscriber queue 106, and allows messages from an application programming interface (API) and/or portal (not depicted) to be placed onto or retrieved from publisher-subscriber queue 106.

In an exemplary traversal through system 100, suppose a client (e.g., an air quality monitoring entity) were to request telemetry measurements to be deleted from the service providers. First, the client would place a message to delete telemetry measurements on publisher-subscriber queue 106 (via north module 108). Assuming that such message is associated with IoT support, such message would be specifically published to subscribers of IoT support. Assuming that heterogeneous cloud controller 102a subscribes to IoT support, heterogeneous cloud controller 102a would retrieve the message from publisher-subscriber queue 106. Heterogeneous cloud controller 102a may translate the message from the global language understood at publisher-subscriber queue 106 into the local language of each of the service providers 104a and 104b. A translated message (one for each of the service providers) would be transmitted to service providers 104a and 104b. Each of the service providers would process the message (i.e., the translated version thereof). In the current example, each of the service providers would delete telemetry measurements (i.e., would delete the telemetry measurements requested by the client). Any reply message from the service providers (e.g., a confirmation that the telemetry measurements have been deleted) could be sent to heterogeneous cloud controller 102a. If necessary, heterogeneous cloud controller 102a would translate the reply messages before placing the reply messages on publisher-subscriber queue 106.

In an alternative embodiment (not depicted), it is noted that there could be two separate publisher-subscriber queues. One publisher-subscriber queue could be used to store requests to be processed by service providers, while another publisher-subscriber queue could be used to store reply messages from service providers.

A service provider may be an organizational entity capable of provisioning compute, accelerator, network and storage resources. Examples of service providers include one or more of AT&T Inc. of Dallas, Tex.; Comcast®

Corporation of Philadelphia, Pa.; Cisco Systems®, Inc. of San Jose, Calif.; Vodafone Group® plc. of London, UK; or Unified Delivery Network (UDN). UDN may be the provider of last resort.

Compute resources include resources which may be used to compute one or more output signals in response to one or more input signals (e.g., CPUs, microcontrollers, digital signal processors, etc.). Accelerator resources include a Graphics Processing Unit (GPU) for video transcoding and/or image compression, a Machine Learning (ML) module, a field-programmable gate array (FPGA) configured to perform advanced parsing of content such as XML or HTML, etc. Network resources include resources which may be used to transport information from one node to another node (e.g., routers, switches, wired/wireless connections). Storage resources include resources which may be used to store information and/or transmit information to remote storage resources (e.g., hard disk drive, solid state drive, optical drive, RAM, ROM, a network interface controller (NIC), etc.). Such resources (e.g., compute, accelerator, network and storage resources) may be provisioned for a particular purpose (e.g., media delivery, servicing of Internet of Things (IoT), storage of content, etc.), generally referred to as a "service" provided by a service provider.

More specifically, a service may represent a declarative definition of a given capability and all of its supporting services. A service may define the metadata that controls registration with other services, such as services offered by a software load balancer (SLB), monitoring, analytics and services offered by a global service load balancer (GSLB). Services may also define resource profiles, such as memory requirements, processor core requirements, etc. Services may also define a hypervisor driver API which provides an abstraction layer that invokes or translates a request from the heterogeneous cloud controller to be delivered to the hypervisor using native APIs of the hypervisor. As is known in the art, each hypervisor provides a specific set of APIs for providing services such as creating a virtual machine (VM), loading code (e.g., an operating system) into a VM, or sizing the resources of the VM (e.g., amount of memory, number of CPUs, etc.). Services may also define an orchestration manager, such as Kubernetes or Mesos, which manages resources, schedules jobs, scales the number of VMs to meet a certain workload, monitors the execution environment (also known as the state of the applications), provides load balancing, and provides security. An orchestration manager enables developers to focus on writing applications instead of the infrastructure required to execute the applications.

In some instances, service providers may adhere to one or more communication standards established by one or more standard bodies, and there is a uniform manner in which north 108 may communicate with multiple service providers and there is a uniform manner in which service providers may communicate with one another. In other cases, service providers may not adhere to communication standards, and north 108 will need to tailor its communication for each service provider. Using a metaphor for ease of discussion, suppose service provider 104a speaks "French" and service provider 104b speaks "German", north 108 would need to communicate in French with service provider 104a and would need to communicate in German with service provider 104b.

Heterogeneous cloud controllers (102a, 102b, 102c) solve the above-described problem, by acting as a translator between one or more service providers and publisher-subscriber queue 106. Continuing with the above-analogy, the heterogeneous cloud controllers essentially allow all messages to be written in English (i.e., a global language) at the publisher-subscriber queue, and heterogeneous cloud controller 102a may be used to translate a message into French (i.e., a local language) for service provider 104a and German (i.e., a local language) for service provider 104b; heterogeneous cloud controller 102b may be used to translate a message into German (i.e., a local language) for service provider 104b; and so on. Service provider 104a can reply to the message in French without needing to know the language of the destination node, and heterogeneous cloud controller 102a can perform the translation from French to English. Likewise, service provider 104b can reply to the message in German without needing to know the language of the destination node, and heterogeneous cloud controller 102a or 102b can perform the translation from German to English.

While each of heterogeneous cloud controllers (102a, 102b, 102c) primary function as a translator, heterogeneous cloud controllers (102a, 102b, 102c) may perform certain initialization and maintenance tasks in order to enable the translation functionality. As part of the initialization process, heterogeneous cloud controllers (102a, 102b, 102c) may need to establish the "global language" and the "global functionality" of each service provided by one or more service providers. Such global language and global functionality is described in association with FIGS. 3A-3C below. Next, the heterogeneous cloud controllers may need to register the "local language" and "local functionality" of a service in the context of the service providers (i.e., the language and functionality specific to a service provider). For example, heterogeneous cloud controller 102a may register the local language and the local functionality of a service in the context of service provider 104a and may further register the local language and the local functionality of the service in the context of service provider 104b. An example of the registration of such information from a service provider is provided below in FIG. 3D.

Subsequently, each of the heterogeneous cloud controllers may create a mapping between the global language of a service as understood at publisher-subscribed queue 106 and the local language(s) of the same service as understood at one or more service providers. For example, heterogeneous cloud controller 102a may create a mapping between the global language of a service as understood at publisher-subscribed queue 106 and the local language of the service as understood at service provider 104a, and further may create a mapping between the global language of the service as understood at publisher-subscribed queue 106 and the local language of the service as understood at service provider 104b. Similarly, each of the heterogeneous cloud controllers may create a mapping between the global functionality of a service as understood at publisher-subscribed queue 106 and the local functionalities of the same service as provided by one or more service providers. For example, heterogeneous cloud controller 102a may create a mapping between the global functionality of a service as understood at publisher-subscribed queue 106 and the local functionality of the service as provided by service provider 104a, and further may create a mapping between the global functionality of the service as understood at publisher-subscribed queue 106 and the local functionality of the service as provided by service provider 104a. In some instances, the mapping may be a simple one-to-one mapping. In other cases, the mapping may not be complete, and an alternative capability (e.g., an alternative action) may performed by a heterogeneous cloud controller in place of a global capability (e.g., a global action) that is not supported by a service provider. An example mapping between the global language and the local language of a service is provided below in FIG. 5, and an example mapping between the global functionality and the local functionality of a service is provided below in FIGS. 4A and 4B.

As part of the maintenance process, the local language and the local functionality of a service may change over time (e.g., may change as part of the software development process). Whenever an update to the local language and the local functionality occurs, the above-described registration and mapping processes may be repeated.

Figure 2A:
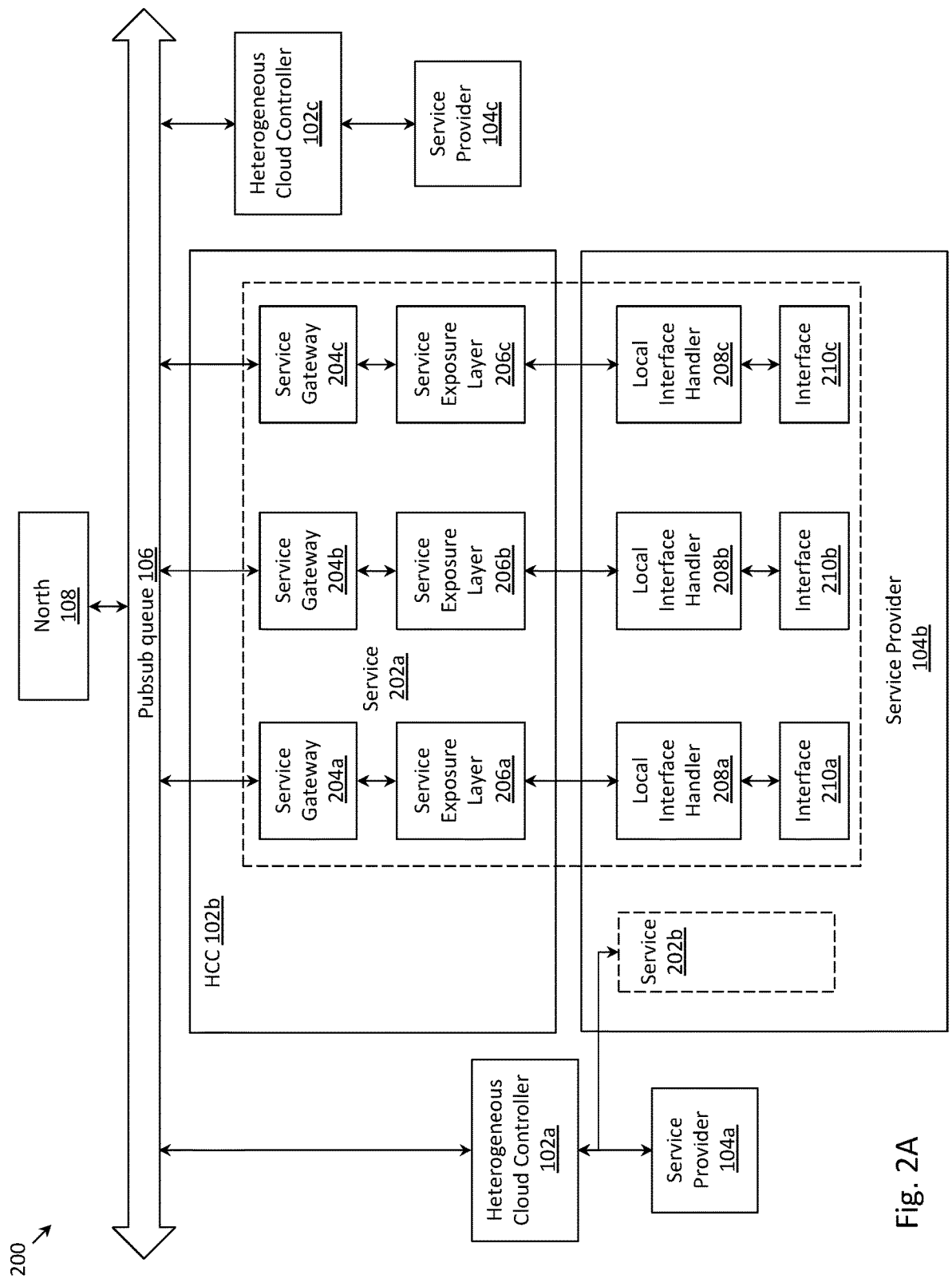
FIGS. 2A-2B depict the computing system of FIG. 1, with additional details regarding some of the heterogeneous cloud controllers and some of the service providers, in accordance with one embodiment of the invention.

FIG. 2A depicts computing system 200, with additional details regarding heterogeneous cloud controller 102b and service provider 104b, in accordance with one embodiment of the invention. As depicted in FIG. 2, service provider 104b may provide a plurality of services (e.g., media delivery, IoT support). While service 202a and 202b are depicted, it is understood that a greater or a fewer number of services may be provided by service provider 104a. In the example, service 202a comprises three interfaces 210a, 210b and 210c (i.e., an interface being a module configured to perform a task in connection with service), but it is understood that a greater or fewer number of interfaces may be present.

Each of the service gateways 204a, 204b and 204c may periodically poll publisher-subscriber queue 106 to see whether there is a message that it needs to process. Assuming that service gateway 204a is configured to process messages for the media delivery service and the purge interface handler, and further assume that a message arrives on the publisher-subscriber queue that is published for service gateways which processes messages for the media delivery service and the purge interface handler, then service gateway 204a would retrieve such message from the publisher-subscriber queue. Service exposure layer 206a may then translate the message from global constructs used at publisher-subscriber queue 106 into local constructs used by service provider 104b. Such translation may comprise translating global metadata into local metadata. For example, a global variable name (e.g., user id) may be translated into a local variable name (e.g., user name), and a parameter value may be translated from a global format (e.g., May 7, 2016) into a local format (e.g., 2016-05-07). Such translation may further comprise translating a global action (e.g., purge) into a local action (e.g., delete).

In some instances, service provider 104b may not support a global action (e.g., invalidate), and service exposure layer 206a may perform an alternative action (e.g., perform URL signing) to provide a result that is similar to a result that would be achieved if the global action could have been performed by service provider 104b. In the example of an alternative to the invalidate action, URL signing (i.e., issuing a different URL each time the URL is requested) will essentially force service provider 104b go to the origin server (not depicted) to retrieve content (instead of retrieving content which is cached locally at service provider 104b). Therefore, URL signing will have the same effect as an invalidate action (i.e., an action to invalidate the cache of service provider 104b).

It is noted that there is more than one strategy for signing a URL. In a first strategy (which is the most typical), the client (i.e., a browser) and the origin server agree upon a cache key, which determines the components of the signature (which is part of the URL, and typically comprises a long string generated by a hash of selected objects) that make up the unique key used to cache an object, access restrictions, and perform freshness checks. More than one scheme can be accommodated by including the signature in the URL. In a second strategy, the origin server may allow a downstream cache to serve an object issuing a unique URL for an object and then provide a response code (i.e., 302 for "found", 301 for "moved permanently", 307 for "temporary redirect") if the origin server determines that the downstream cache is allowed to serve the object. Both strategies require the client to forward the request to the origin server for validation.

Upon successfully translating the message, the translated message may be transmitted to local interface handler 208a, which may communicate with interface 210a in order to process the message. Any reply message may then be generated and transmitted to service exposure layer 206a. If needed, service exposure layer 206a may translate the reply message (e.g., translating any local variable names to global variable names, translating any parameter values from a local format to a global format), before providing the reply message to service gateway 204a, which publishes the reply message on publisher-subscriber queue 106.

Service gateways 204b and 204c may function in a similar fashion as service gateway 204a, except that they retrieve messages that are to be processed by interfaces 210b and 210c, respectively. Service exposure layers 206b and 206c may function in a similar fashion as service exposure layer 206a, except that they translate messages for interfaces 210b and 210c. Local interface handlers 208b and 208c may function in a similar manner as local interface handler 208a, except that they handle messages for interfaces 210b and 210c.

Figure 2B:
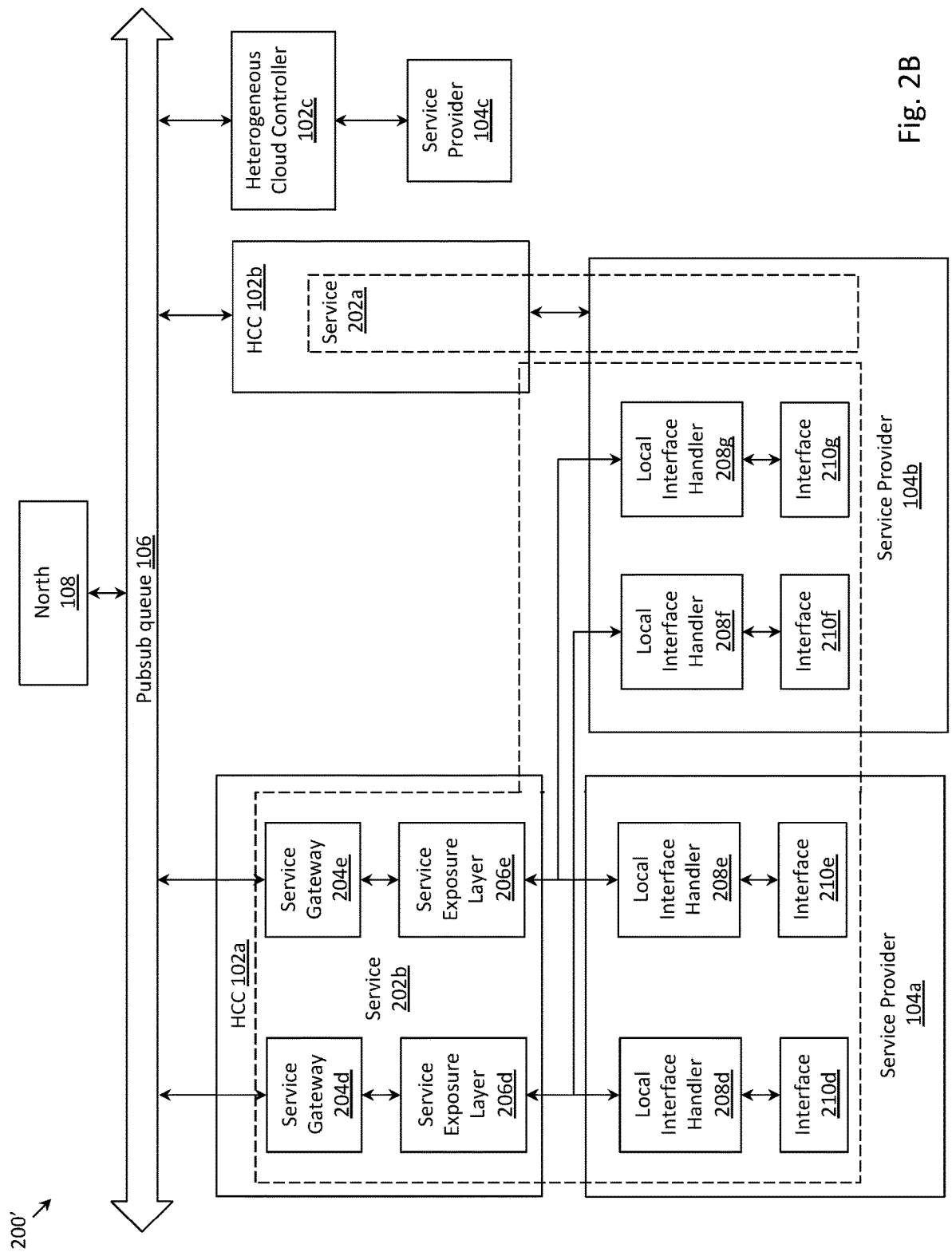

FIG. 2B depicts computing system 200', with additional details regarding heterogeneous cloud controller 102a and service providers 104a and 104b, in accordance with one embodiment of the invention. FIG. 2B illustrates the scenario in which one heterogeneous cloud controller acts as an intermediary for a plurality of service providers (in this example, service providers 104a and 104b). The main distinction between FIG. 2B and FIG. 2A is that in FIG. 2B, each of the service exposure layer modules are communicatively coupled to a plurality of local interface handlers. For example, service exposure layer 206d is communicatively coupled to local interface handler 208d and local interface handler 208f; and service exposure layer 206e is communicatively coupled to local interface handler 208e and local interface handler 208g.

When a message is retrieved by service gateway 204d, it is translated by service exposure layer 206d into the local language of service provider 104a and into the local language of service provider 104b. One translated version of the message is then provided to local interface handler 208d, and the other translated version of the message is then provided to local interface handler 208f If any reply messages are generated by the service providers 104a and 104b, the reply message are provided to service exposure layer 206b (e.g., via a pull or a push mechanism) before the reply message is published onto publisher-subscriber queue 106.

FIG. 3A provides a definition of a global interface handler (i.e., purge), in accordance with one embodiment of the invention. As indicated by the definition "type": "mediadelivery", the purge interface handler is defined for the service of media delivery. As indicated by the definition "interface": "purge", the name of the purge interface handler is purge. As indicated by the definition "schema endpoint": "api.udn.net/account/1/services/purge/schema", the schema used by the purge interface handler is provided at the page referenced by the URL api.udn.net/account/1/services/purge/schema (such schema provided below in FIG. 3B). As indicated by the definition "capabilities_endpoint": "api.und.net/purge/capabilities", the capabilities provided by the purge interface handler are provided at the page referenced by the URL api.und.net/purge/capabilities (such capabilities provided below in FIG. 3C). As indicated by the definition "protocol": "https", the purge interface handler uses the https protocol (i.e., which means that the rest endpoint requires HTTPS secure communications). As indicated by the definition "authentication": "token", the global purge interface handler requires token authentication to be performed before allowing an entity to communicate with the purge interface handler.

As further indicated in FIG. 3A, other global interface handlers for the service of media delivery may include account creation, business service creation, logging, and request routing. Definitions for these other global interface handlers have not been provided, but may similarly include a definition of an interface name, a schema endpoint, a capabilities endpoint, a protocol type and an authentication type. The set of global interface handlers for a particular service may be determined by forming a collection of the local interface handlers that have already been registered for the same service by a plurality of service providers. For instance if service provider 1 were to register interface handlers A, B and D for service 1 and service provider 2 were to register interface handlers B, C and D for service 1, the global interface handlers for service 1 would be A, B, C and D. As indicated by the definition "start date": "x.x.x" and "end_date": "x.x.x", the definition of these interface handlers for the service of media delivery may be valid from the start date until the end date.

Regarding the global interface handler of "logging", it is noted that log files may either be pushed from a service provider to the heterogeneous cloud controller (whenever a log is generated) or pulled by the heterogeneous cloud controller from the service provider (in a polling process). In either case, proper communication channels would need to be setup during the registration process with a service provider to enable the transfer of log files. For a push-based transfer of log files, a service provider would need to be informed of the API of the heterogeneous cloud controller to which a log is pushed. For a pull-based transfer of log files, a service provider would need to provide the heterogeneous cloud controller with the API from which the heterogeneous cloud controller will pull a log file. While log files are one type of file that may be pulled or pushed from a service provider, other types of files (e.g., the status of a purge request) may be transferred from a service provider to the heterogeneous cloud controller in a similar manner. A particular type of push notification may be a callback, in which a notification is asynchronously pushed to the heterogeneous cloud controller after the completion of a certain action by the service provider.

FIG. 3B provides a definition of the schema for a global interface handler (i.e., purge), in accordance with one embodiment of the invention. The schema describes all the variables that are used in the global interface handler. For example, for the purge global interface handler, the variables of action, objects, note and feedback are required. The data type of the action variable is "string"; the data type of the objects variable is "string"; the data type of the feedback variable is "string"; and so on.

FIG. 3C provides a definition of the capabilities of a global interface handler (i.e., purge), in accordance with one embodiment of the invention. As indicated by the definition "purge_actions": ["purge","invalidate"], the global purge interface handler provides the actions of "purge" and "invalidate". A purge action calls for the physical deletion of an object from the physical media of the cache of a service provider (which means that the object will no longer be served). An invalidate action requires the cache that is serving the content to check with the origin server as to whether the contents it is serving is still valid. If the contents are still valid, the cache can serve that content. Otherwise, the cache will need to retrieve a new copy of the contents from the origin server before serving the contents. As indicated by the definition "objects": ["directory", "file", "extension", "glob", "regex", "domains", "account", "group" ], the global purge interface handler operates on the objects of a directory, a file, an extension, a glob, a regex, domains, an account and a group. In other words, the above-described actions may be applied to these objects (e.g., a directory may be purged, a file may be purged, an account may be invalidated, a group may be invalidated, etc.). As indicated by the definition "status": ['job'; "queue_size", "estimated_queue_time" ], the status of a job may be returned by the global purge interface handler, the status of the purge queue size may be returned by the global purge interface handler, etc.

FIG. 3D provides registration information of a local interface handler (i.e., purge) of a service provider, in accordance with one embodiment of the invention. As indicated by the definition "name": "mediadelivery", the local purge interface handler is defined by a service provider for a media delivery service. As indicated by the definition "interface": "purge", the name of local purge interface handler is purge. As indicated by the definition "endpoint": "api.sp.net/udn/purge", the endpoint for the local purge interface handler is api.sp.net/udn/purge. More specifically, the registration API handlers may contain the following data:

| | |
|---|---|
| Account_id | ID of the service provider registering this handler |
| X-Auth-Token | Authorization token generated for this service provider in a prior step, must be valid for the remainder of the request to be accepted |
| Services | A list of handlers to register |
| Interface | A specific handler to register, "purge" in this case |
| Endpoint | The service provider endpoint to call when a purge operation needs to be performed for this service provider |
| Protocol | Protocol to use for invoking this endpoint (e.g., https) |
| Authentication | The type of authentication this service provider requires to allow the heterogeneous cloud controller to call this endpoint |
| Capabilities | An array that describes the methods supported by this service provider, in this case the purge methods |
| Purge_actions | A list of purge request types supported by this service provider |
| Objects | An array that specifies how objects to be purged can be represented. This provider supports purging: directories files or an entire account |
| Status | The methods that the heterogeneous cloud controller (or other component) can use to check the status of a existing purge job, or aggregated statistics for purge operations |

As indicated by the definition "protocol": "https", https is required for communication with the local purge interface handler. As indicated by the definition "authentication": "token", the local purge interface handler requires token authentication to be performed before allowing an entity to communicate with the local purge interface handler. As indicated by the definition "purge_actions": ["purge"], the local purge interface handler provides the action of purge. As indicated by the definition "objects": ["directory", "file", "account"], the action of the local purge interface handler may be applied to the objects of a directory, a file and an account. As indicated by the definition "status": ["job", "queue_size", "estimated_queue_time"], the status of a job may be returned by the local purge interface handler, the status of the purge queue size may be returned by the local purge interface handler, etc.

As further indicated in FIG. 3D, other local interface handlers for the service of media delivery may include logging, account creation, business service creation and request routing. Definitions for these other local interface handlers have not been provided, but may similarly include a definition of an interface name, an endpoint, a protocol type, an authentication type, and a list of capabilities.

FIG. 4A depicts a mapping from a set of global interface handlers for the service of media delivery to a set of local interface handlers for the service of media delivery, in accordance with one embodiment of the invention. As depicted in the example of FIG. 4A, there is a one-to-one mapping between the global interface handlers and the local interface handlers. If a global interface handler does not map to a local interface handler (which is possible in another example), that means that the global interface handler is not supported by the service provider. In some cases, a slight mismatch between a global interface handler and a local interface handler is tolerable. For instance, suppose a service provider does not support purge global interface handler, but the service provider does support invalidate. In that case, it would depend on the client (e.g., a content provider), on whether a service provider would be used. A client may require that a service provider support purge, and in that case the above-mentioned service provider would not be used for the client. Such requirement of the client could even be on a per content basis (i.e., a portion of the content can be processed by a service provider with invalidate but not purge, but another portion of the content must go to a service provider with purge, etc.)

FIG. 4B depicts a mapping from a list of global capabilities to a list of local capabilities, in accordance with one embodiment of the invention. As depicted in FIG. 4B, the purge action of the global purge interface handler maps to the purge action of the local purge interface handler. However, there is no action of the local purge interface handler which maps to the invalidate action of the global purge interface handler. As described above, URL signing may be an alternative action that may be performed by heterogeneous cloud controller in place of the invalidate action at the local purge interface handler.

As depicted in FIG. 4B, the directory, file and account objects of the global purge interface handler map to the directory, file and account objects of the local purge interface handler, respectively. However, no objects of the local purge interface handler map to the extension, glob, regex domains and group objects provided by the global purge interface handler. Such mismatch in the capabilities may have the following effect. A client (e.g., a content provider) may notify the heterogeneous cloud controller that it wants to work with service providers that process glob and group objects. If a service provider does not support those capabilities, that service provider will not be selected by the heterogeneous cloud controller for that particular client.

Regarding the mapping between the global protocol and the local protocol, it is noted that the protocols match in this example (i.e., both are https). If there is a mismatch, the mismatch may first be logged into a global exception queue. However, before a service provider is used by a client, the service provider must pass a certification process by the heterogeneous cloud controller that should detect and correct such failures in handler negotiation.

Similarly, regarding the mapping between the global authentication scheme and the local authentication scheme, it is noted that the authentication schemes match in this example (i.e., both use token authentication). In another example, there may be several acceptable global authentication schemes, and the local authentication scheme would be acceptable if it matches one of the global authentication schemes.

Figure 5:
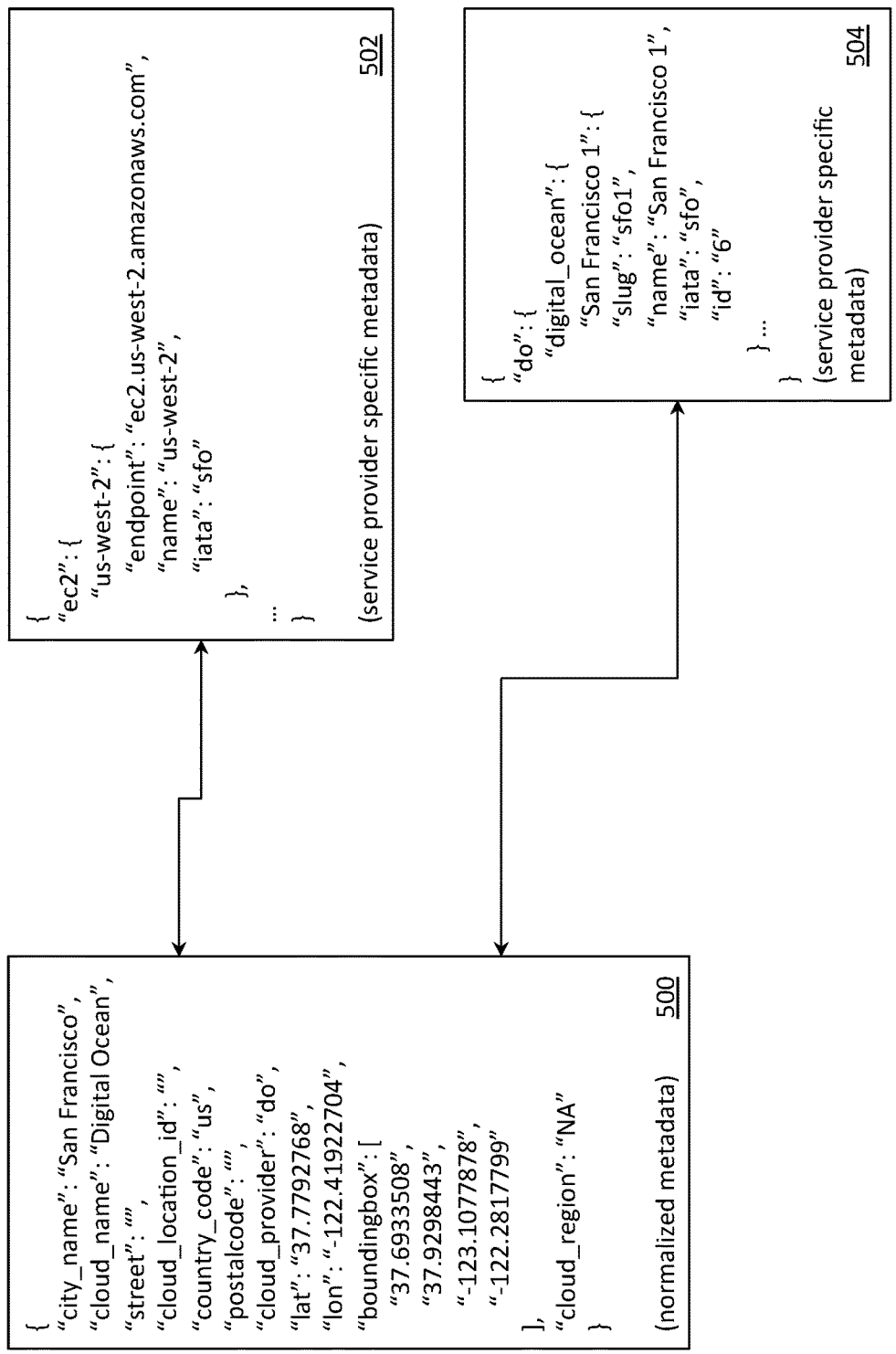
FIG. 5 provides an example of the normalization of metadata, in accordance with one embodiment of the invention.

FIG. 5 provides an example of the normalization of metadata, in accordance with one embodiment of the invention. Metadata 502 and 504 describe the locations where a service of the service providers "ec2" and "digital ocean", respectively, may be provisioned (such as the provisioning of a server or storage) and metadata 500 describes a normalized view of those locations. If a message with the location information depicted in FIG. 5 were transmitted from a heterogeneous cloud controller to a service provider, the location information would be translated from the normalized representation to the service provider specific representation. On the other hand, if a message with the location information depicted in FIG. 5 were transmitted from a service provider to the heterogeneous cloud controller, the location information would be translated from the service provider specific representation into the normalized representation.

Figure 6:
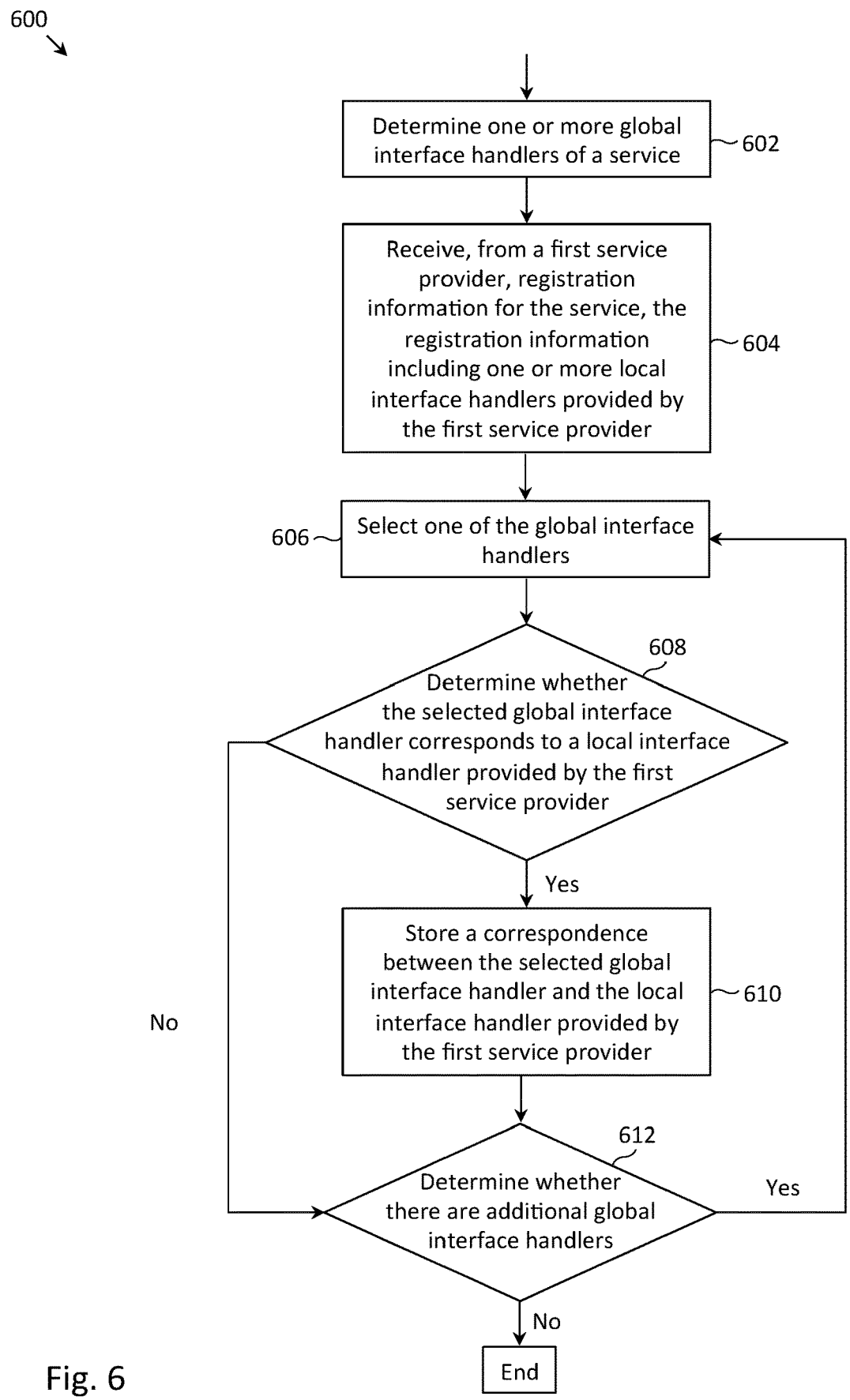
FIG. 6 depicts a flow diagram of a process to establish a correspondence between the global interface handlers and local interface handlers, in accordance with one embodiment of the invention.

FIG. 6 depicts flow diagram 600 of a process to establish a correspondence between the global interface handlers and local interface handlers, in accordance with one embodiment of the invention. At step 602, a heterogeneous cloud controller may determine one or more global interface handlers of a service. In one embodiment, the heterogeneous cloud controller may determine the one or more global interface handlers of a service by receiving one or more global interface handlers of a service from a system administrator. In another embodiment, the heterogeneous cloud controller may determine the one or more global interface handlers of a service programmatically. As described above, one approach for determining the one or more global interface handlers of a service is to form a collection of the local interface handlers which have already been registered for the service.

As described above in FIG. 3A, the global interface handlers for the service of media delivery include account creation, business service creation, log gathering, purging and request routing.

At step 604, the heterogeneous cloud controller may receive from a first service provider registration information for the service. For example, heterogeneous cloud controller 102a may receive registration information from service provider 104a. The registration information may include one or more local interface handlers provided by the first service provider. As described above in FIG. 3D, the local interface handlers for the service of media delivery included purge, logging and account creation. At step 606, one of the global interface handlers may be selected (e.g., purge). At step 608, the heterogeneous cloud controller may determine whether the selected global interface handler (e.g., purge) corresponds to a local interface handler provided by the first service provider. If so, a correspondence between the global interface handler and the local interface handler provided by the first service provider may be stored (step 610). For example, a correspondence between the global purge interface handler and the local purge interface handler was stored in the table depicted in FIG. 4A. Following step 610 or following a determination that the selected global interface handler fails to correspond to any local interface handler (i.e., "No" branch of step 608), the heterogeneous cloud controller may determine whether there are any additional global interface handlers to consider. If so, the procedure may repeat from step 606. In the example of FIG. 4A, a correspondence was established between the global interface handlers of purge, logging, account creation, business services creation and request routing and the local interface handlers of purge, logging, account creation, business services creation and request routing respectively. If there are no additional global interface handlers to process, the procedure of establishing a correspondence between global interface handlers and local interface handlers ends.

Figure 7:
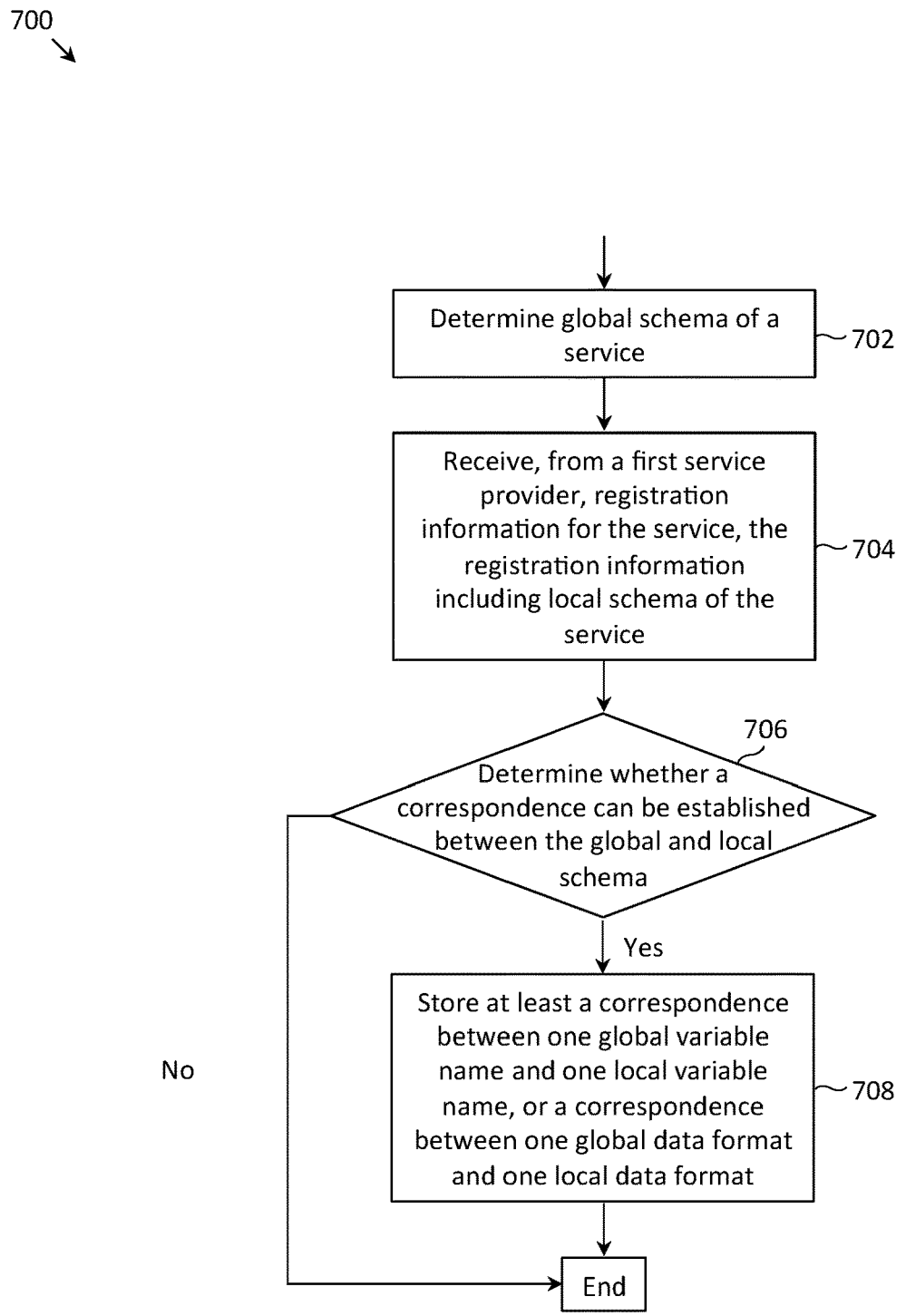
FIG. 7 depicts a flow diagram of a process to establish a correspondence between global schema and local schema, in accordance with one embodiment of the invention.

FIG. 7 depicts flow diagram 700 of a process to establish a correspondence between global schema and local schema, as provided by a service provider, in accordance with one embodiment of the invention. At step 702, the heterogeneous cloud controller may determine a global schema of a service. In one embodiment, the heterogeneous cloud controller may determine the global schema of a service by receiving the global schema of a service from a system administrator. As described above, the global schema of a service may include one or more global variable names and one or more global data formats.

At step 704, the heterogeneous cloud controller may receive from a first service provider registration information for the service. For example, heterogeneous cloud controller 102a may receive registration information from service provider 104a. The registration information may include the local schema of a service, as provided by the first service provider. As described above, the local schema of a service may include one or more local variable names and one or more local data formats.

At step 706, the heterogeneous cloud controller may determine whether a correspondence can be established between the global and local schema. If so, at least a correspondence between one global variable name and one local variable name, or a correspondence between one global data format and one local data format may be stored (step 708). After step 708 or upon determining that no correspondence may be established between the global and local schema, the process may end.

Figure 8:
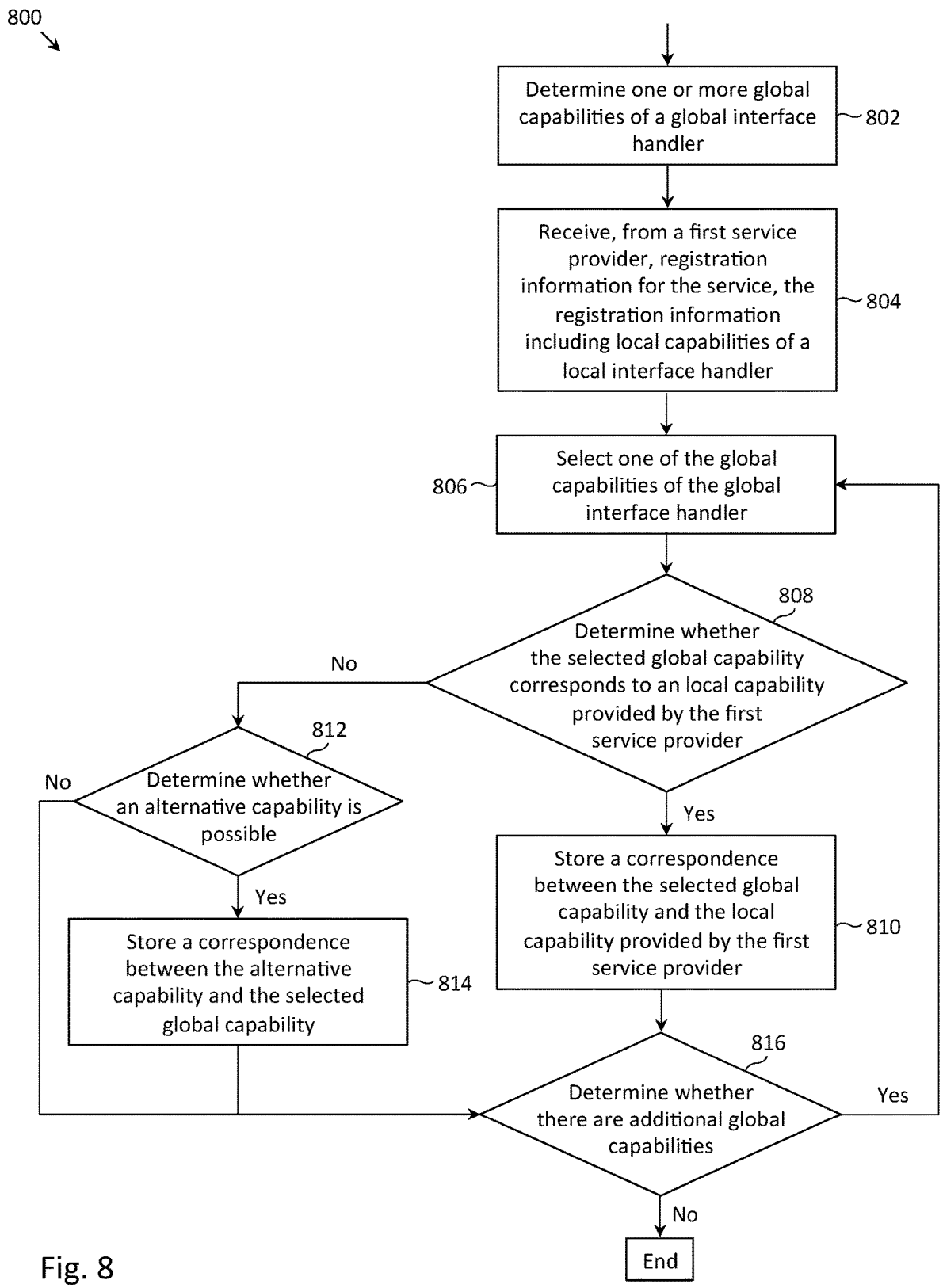
FIG. 8 depicts a flow diagram of a process to establish a correspondence between capabilities of a global interface handler and capabilities of a local interface handler, in accordance with one embodiment of the invention.

FIG. 8 depicts flow diagram 800 of a process to establish a correspondence between global capabilities and local capabilities, in accordance with one embodiment of the invention. At step 802, a heterogeneous cloud controller may determine one or more global capabilities of a global interface handler of a service. In one embodiment, the heterogeneous cloud controller may determine the one or more global capabilities by receiving one or more global capabilities of a global interface handler from a system administrator. In another embodiment, the heterogeneous cloud controller may determine the one or more global capabilities of a global interface handler programmatically. For example, one approach for determining the one or more global capabilities of a global interface handler is to form a collection of the local capabilities which have already been registered for the local global interface handler(s) corresponding to the global interface handler. The global capabilities for the global purge interface handler were described above in FIG. 3C.

At step 804, the heterogeneous cloud controller may receive from a first service provider registration information for the service. For example, heterogeneous cloud controller 102a may receive registration information from service provider 104a. The registration information may include one or more local capabilities of a local interface handler. The local capabilities for the local purge interface handler were described above in FIG. 3D. At step 806, one of the global capabilities of the global interface handler may be selected (e.g., purge action). At step 808, the heterogeneous cloud controller may determine whether the selected global capability (e.g., purge action) corresponds to a capability provided by the first service provider. If so, a correspondence between the global capability and the local capability provided by the first service provider may be stored (step 810). For example, a correspondence between the global purge action and the local purge action was stored in the table depicted in FIG. 4B.

If, however, a determination is made at step 808 that the selected global capability (e.g., invalidate) fails to correspond to any local capability (i.e., "No" branch of step 808), the heterogeneous cloud controller may determine whether an alternative capability is possible. As described above in FIG. 4B, the alternative action of URL signing may be used for the global action of invalidate corresponding to the interface handler of purging. If an alternative capability exists, a correspondence between the alternative capability and the global capability may be stored (step 814). For example, a correspondence between the global invalidate action and the URL signing alternative action was stored in the table in FIG. 4B.

Following step 810 or step 814, the heterogeneous cloud controller may determine whether there are any additional global capabilities to consider. If so, the procedure may repeat from step 806. Otherwise, the procedure of establishing a correspondence between global capabilities and local capabilities ends.

Figure 9:
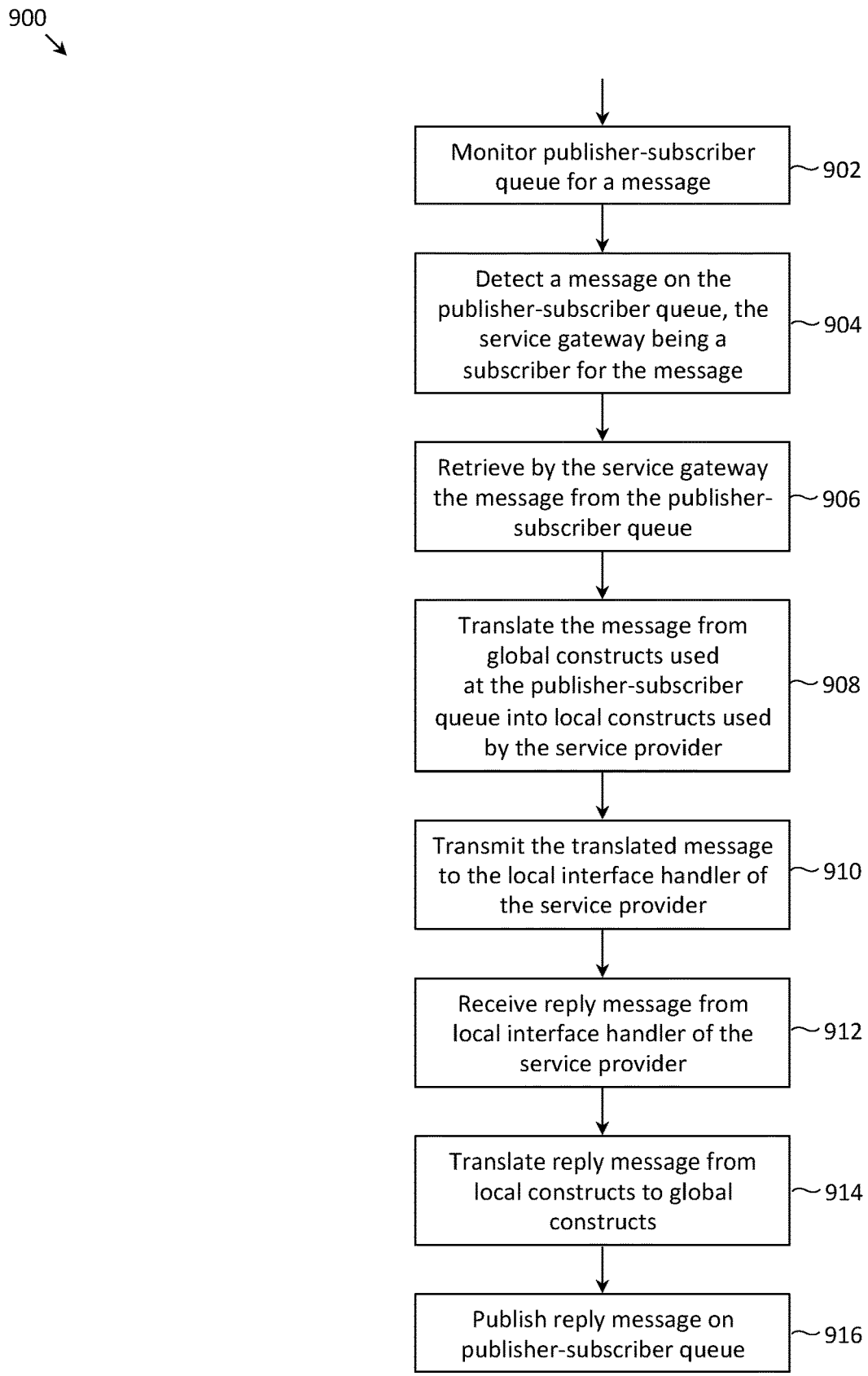
FIG. 9 depicts a flow diagram of a process in which a service provider processes a message from a publisher-subscriber queue with the assistance of a heterogeneous cloud controller, in accordance with one embodiment of the invention.

FIG. 9 depicts flow diagram 900 of a process in which a service provider processes a message from a publisher-subscriber queue with the assistance of a heterogeneous cloud controller, in accordance with one embodiment of the invention. At step 902, a service gateway of the heterogeneous cloud controller (e.g., service gateway 204a) may monitor publisher-subscriber queue 106 for message. Upon detecting a message that the service gateway subscribes to (i.e., a message requesting the same service and interface handler provided by the service gateway), the service gateway may retrieve the message from publisher-subscriber queue 106. At step 908, a service exposure layer (SEL) of the heterogeneous cloud controller may translate the message from global constructs used at the publisher-subscriber queue into local constructs used by the service provider. In one embodiment, translating the message may comprise translating global metadata into local metadata, and translating global metadata into local metadata may comprise translating at least one global variable name into at least one local variable name, and translating at least one parameter from a global format to a local format. Additionally, translating the message may comprise translating a global capability of the global interface handler into a local capability of the local interface handler. If the message requests an action that is not supported by the service provider, and such action is supported by a alternative action of the heterogeneous cloud controller, the heterogeneous cloud controller may perform the alternative action. As described above, if an invalidate action is not supported by the service provider, the heterogeneous cloud controller may perform a URL signing action.

At step 910, the translated message may be transmitted from the SEL to the local interface handler of the service provider. At step 912, a reply message may be received by the SEL from the local interface handler (in either a push or a pull fashion). At step 914, the SEL may translate the reply message from local constructs to global constructs. In one embodiment, local metadata may be translated into global metadata (e.g., in the normalization process described in FIG. 5). At step 916, the service gateway may publish the reply message on the publisher-subscriber queue.

Figure 10:
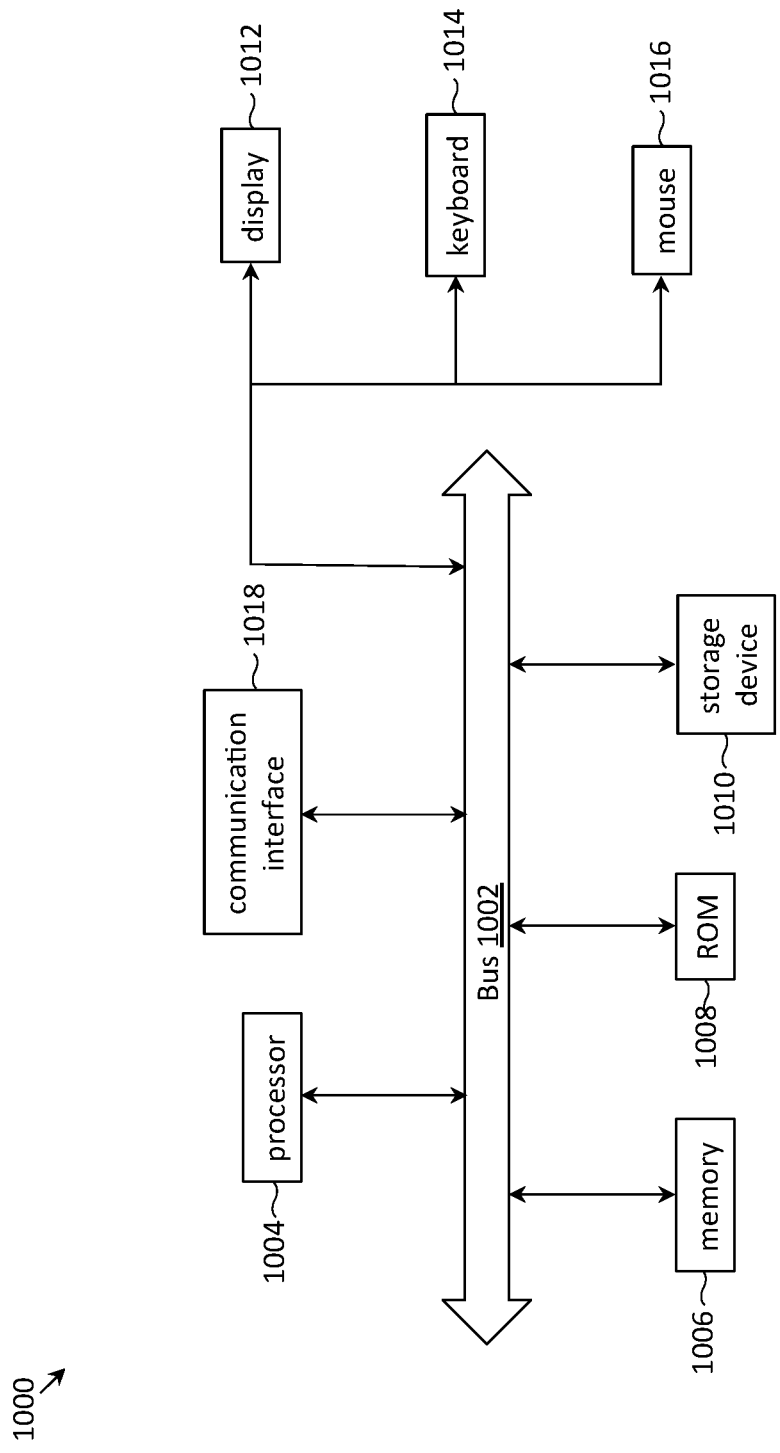
FIG. 10 depicts components of a computer system in which computer readable instructions instantiating the methods of the present invention may be stored and executed.

FIG. 10 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 10 provides an example of a system 1000 that may be representative of any of the computing systems (e.g., compute, accelerator, network and storage resources) discussed herein. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1000 may be coupled via the bus 1002 to a display 1012, such as a flat panel display, for displaying information to a computer user. An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Other user interface devices, such as microphones, speakers, etc. are not shown in detail but may be involved with the receipt of user input and/or presentation of output.

The processes referred to herein may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1000 or similar electronic computing device, that manipulates and transforms data represented as physical (electronic) quantities within its registers and memories into other data similarly represented as physical quantities within its memories or registers or other such information storage, transmission or display devices.

Computer system 1000 also includes a communication interface 1018 coupled to the bus 1002. Communication interface 1018 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with hosts accessible via the Internet. It is noted that the components of system 1000 may be located in a single device or located in a plurality of physically and/or geographically distributed devices.

Thus, methods and systems for interfacing a plurality of heterogeneous service providers to a publisher-subscriber queue via a plurality of heterogeneous cloud controller have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a heterogeneous cloud controller, the method comprising:
  for a service that is provided by a plurality of service providers, determining at least one global interface handler for the service;
  receiving, from a first one of the service providers, registration information for the service, the registration information including at least one local interface handler provided by the first service provider;
  determining whether the global interface handler corresponds to the received local interface handler provided by the first service provider; and
  as a result of determining that the global interface handler corresponds to the local interface handler, storing in a mapping a correspondence between the global interface handler and the local interface handler provided by the first service provider, wherein
  for the service of media delivery, the global interface handlers include account creation, business service creation, log gathering, purging and request routing.

2. The method of claim 1, wherein
the registration information further includes a local schema used by the first service provider, the local schema including at least one local variable name and at least one local data format, and
the method further comprises:
for the service that is provided by a plurality of service providers, determining a global schema, the global schema including at least one global variable name and at least one global data format,
determining whether a correspondence can be established between the global and local schema; and
storing in the mapping i) a correspondence between the global variable name and the local variable name and/or ii) a correspondence between the global data format and the local data format.

3. The method of claim 1, wherein the service is one of media delivery and Internet of Things (IoT) support.

4. The method of claim 1, wherein
the registration information further includes local capabilities of the local interface handler, the local capabilities including one or more local actions, object, or status associated with the local interface handler, and
the method further comprises:
determining global capabilities of the global interface handler, the global capabilities including one or more global actions, objects, or status associated with the global interface handler;
determining whether a correspondence can be established between the global capabilities of the global interface handler and the local capabilities of the local interface handler;
as a result of determining that a correspondence can be established between the global capabilities of the global interface handler and the local capabilities of the local interface handler, storing in the mapping at least a correspondence between one global action and one local action, one global object and one local object, or one global status and one local status;
determining that a first global action of the global interface handler fails to correspond to any of the local actions of the local interface handler; and
determining whether an alternative action exists, wherein the alternative action, when performed by the heterogeneous cloud controller accomplishes a result that is similar to a result that would be achieved if the first global action could be performed by the local interface handler, and if the alternative action exists, storing in the mapping a correspondence between the first global action and the alternative action.

5. The method of claim 4, wherein the global interface handler is a purge interface handler, the first global action is an invalidate action, and the alternative action is URL signing.

6. A method for a heterogeneous cloud controller, the method comprising:
for a service that is provided by a plurality of service providers, determining at least one global interface handler for the service;
receiving, from a first one of the service providers, registration information for the service, the registration information including at least one local interface handler provided by the first service provider;
determining whether the global interface handler corresponds to the received local interface handler provided by the first service provider; and
as a result of determining that the global interface handler corresponds to the local interface handler, storing in a mapping a correspondence between the global interface handler and the local interface handler provided by the first service provider, wherein
the registration information further includes local capabilities of the local interface handler, the local capabilities including one or more local actions, object, or status associated with the local interface handler, and
the method further comprises:
determining global capabilities of the global interface handler, the global capabilities including one or more global actions, objects, or status associated with the global interface handler;
determining whether a correspondence can be established between the global capabilities of the global interface handler and the local capabilities of the local interface handler; and
as a result of determining that a correspondence can be established between the global capabilities of the global interface handler and the local capabilities of the local interface handler, storing in the mapping at least a correspondence between one global action and one local action, one global object and one local object, or one global status and one local status.

7. The method of claim 6, further comprising:
determining that a first global action of the global interface handler fails to correspond to any of the local actions of the local interface handler; and
determining whether an alternative action exists, wherein the alternative action, when performed by the heterogeneous cloud controller accomplishes a result that is similar to a result that would be achieved if the first global action could be performed by the local interface handler, and if the alternative action exists, storing in the mapping a correspondence between the first global action and the alternative action.

8. The method of claim 7, wherein the global interface handler is a purge interface handler, the first global action is an invalidate action, and the alternative action is URL signing.

9. The method of claim 6, wherein for the service of media delivery, the global interface handlers include account creation, business service creation, log gathering, purging and request routing.

10. The method of claim 6, wherein
the registration information further includes a local schema used by the first service provider, the local schema including at least one local variable name and at least one local data format, and
the method further comprises:
for the service that is provided by a plurality of service providers, determining a global schema, the global schema including at least one global variable name and at least one global data format,
determining whether a correspondence can be established between the global and local schema; and
storing in the mapping i) a correspondence between the global variable name and the local variable name and/or ii) a correspondence between the global data format and the local data format.

11. The method of claim 6, wherein the service is one of media delivery and Internet of Things (IoT) support.

12. A method for a heterogeneous cloud controller, the heterogeneous cloud controller comprising a service gateway and a service exposure layer (SEL), and the SEL communicatively coupled to a local interface handler of a service provider, the method comprising:

monitoring, by the service gateway, a publisher-subscriber queue for messages;

in response to detecting a message on the publisher-subscriber queue, and the service gateway is a subscriber for the message, retrieving, by the service gateway, the message from a publisher-subscriber queue;

translating the message from global constructs used at the publisher-subscriber queue into local constructs used by the service provider;

transmitting the translated message from the SEL to the local interface handler of the service provider;

determining whether the message requests an action that is not supported by the service provider;

determining whether such requested action is supported by an alternative action of the heterogeneous cloud controller; and as a result of determining that the message requests an action that is not supported by the service provider and determining that such requested action is supported by an alternative action of the heterogeneous cloud controller, performing the alternative action by the heterogeneous cloud controller.

13. The method of claim 12, wherein translating the message comprises translating global metadata into local metadata, and wherein translating global metadata into local metadata comprises translating at least one global variable name into at least one local variable name, and translating at least one parameter from a global data format to a local data format.

14. The method of claim 12, wherein translating the message comprises translating a global capability of the global interface handler into a local capability of the local interface handler.

15. The method of claim 12, wherein the requested action is an invalidate action and the alternative action is URL signing.

16. The method of claim 12, wherein the service is one of media delivery and Internet of Things (IoT) support.

17. The method of claim 12, wherein for the service of media delivery, the global interface handlers include account creation, business service creation, log gathering, purging and request routing.

* * * * *